United States Patent
Fang et al.

(10) Patent No.: US 10,348,127 B2
(45) Date of Patent: Jul. 9, 2019

(54) THREE-PHASE UNINTERRUPTIBLE POWER SUPPLY CONTROL METHOD AND APPARATUS, AND THREE-PHASE UNINTERRUPTIBLE POWER SUPPLY RESPONSIVE TO ZERO WIRE LOSS

(71) Applicant: Huawei Technologies Co., Ltd., Shenzhen (CN)

(72) Inventors: Xiaoting Fang, Nuremberg (DE); Xianghui Liang, Shenzhen (CN); Yongqiao Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 15/386,196

(22) Filed: Dec. 21, 2016

(65) Prior Publication Data

US 2017/0117749 A1     Apr. 27, 2017

Related U.S. Application Data

(63) Continuation of application No. PCT/CN2015/075034, filed on Mar. 25, 2015.

(30) Foreign Application Priority Data

Jun. 27, 2014    (CN) .......................... 2014 1 0305779

(51) Int. Cl.
| | |
|---|---|
| *H02J 9/06* | (2006.01) |
| *H02M 7/219* | (2006.01) |
| *H02J 3/26* | (2006.01) |

(52) U.S. Cl.
CPC ............. *H02J 9/062* (2013.01); *H02M 7/219* (2013.01); *H02J 3/26* (2013.01); *H02J 2009/063* (2013.01); *Y02E 40/50* (2013.01)

(58) Field of Classification Search
CPC .................... H02M 7/04–25; H02M 1/08–096
See application file for complete search history.

(56) References Cited

U.S. PATENT DOCUMENTS

| | | |
|---|---|---|
| 5,432,695 A | 7/1995 | Vlatkovic et al. |
| 8,300,436 B2 | 10/2012 | Ha et al. |
| (Continued) | | |

FOREIGN PATENT DOCUMENTS

| | | |
|---|---|---|
| CN | 1476139 A | 2/2004 |
| CN | 1540848 A | 10/2004 |
| (Continued) | | |

OTHER PUBLICATIONS

English machine translation of CN1627620 published Jun. 15, 2005. (Year: 2005).*

(Continued)

*Primary Examiner* — Rexford N Barnie
*Assistant Examiner* — David A Shiao
(74) *Attorney, Agent, or Firm* — Conley Rose, P.C.

(57) ABSTRACT

A three-phase UPS control method and apparatus, and a three-phase uninterruptible power supply resolve a problem that after a zero wire is lost, when a current control method is applied to a three-phase UPS using a three-level topology, a 0-axis direct-current modulated wave results in that positive and negative buses are unbalanced. The method includes: determining that a zero wire of a three-phase uninterruptible power supply is lost; using an alternating current whose frequency is a harmonic frequency of mains as a 0-axis reference current; and generating a 0-axis modulated wave according to a difference between the 0-axis reference current and a 0-axis sampling current, to control a rectifier in the three-phase uninterruptible power supply to convert a received alternating current to a direct current.

20 Claims, 7 Drawing Sheets

(56) References Cited

U.S. PATENT DOCUMENTS

| | | | | |
|---|---|---|---|---|
| 2005/0162137 | A1* | 7/2005 | Tracy | H02J 9/062 |
| | | | | 323/217 |
| 2005/0207192 | A1* | 9/2005 | Fu | H02M 7/219 |
| | | | | 363/89 |
| 2009/0295229 | A1* | 12/2009 | Harke | H02M 7/217 |
| | | | | 307/75 |
| 2011/0038192 | A1* | 2/2011 | Kawashima | H02M 1/4233 |
| | | | | 363/127 |
| 2011/0134669 | A1* | 6/2011 | Yuzurihara | H02M 7/219 |
| | | | | 363/89 |
| 2012/0140537 | A1* | 6/2012 | Fattal | H02M 1/4216 |
| | | | | 363/126 |

FOREIGN PATENT DOCUMENTS

| | | |
|---|---|---|
| CN | 1610231 A | 4/2005 |
| CN | 1627620 A | 6/2005 |
| CN | 1664605 A | 9/2005 |
| CN | 100388608 C | 5/2008 |
| CN | 101686006 A | 3/2010 |
| CN | 102097959 A | 6/2011 |
| CN | 103023358 A | 4/2013 |
| CN | 104065276 A | 9/2014 |
| EP | 2381573 A1 | 10/2011 |
| JP | H11266535 A | 9/1999 |
| WO | 2013070237 A1 | 5/2013 |
| WO | 2013122581 A1 | 8/2013 |

OTHER PUBLICATIONS

English machine translation of CN1664605 published Sep. 7, 2005 (Year: 2005).*

Machine Translation and Abstract of Chinese Publication No. CN1476139, Feb. 18, 2004, 11 pages.
Machine Translation and Abstract of Chinese Publication No. CN1540848, Oct. 27, 2004, 8 pages.
Machine Translation and Abstract of Chinese Publication No. CN1610231, Apr. 27, 2005, 17 pages.
Machine Translation and Abstract of Chinese Publication No. CN1627620, Jun. 15, 2005, 16 pages.
Machine Translation and Abstract of Chinese Publication No. CN1664605, Sep. 7, 2005, 15 pages.
Machine Translation and Abstract of Chinese Publication No. CN100388608, May 14, 2008, 9 pages.
Machine Translation and Abstract of Chinese Publication No. CN102097959, Jun. 15, 2011, 7 pages.
Machine Translation and Abstract of Chinese Publication No. CN103023358, Apr. 3, 2013, 8 pages.
Machine Translation and Abstract of Chinese Publication No. CN104065276, Sep. 24, 2014, 12 pages.
Foreign Communication From a Counterpart Application, European Application No. 15812564.1, Extended European Search Report dated May 15, 2017, 6 pages.
Foreign Communication From a Counterpart Application, Chinese Application No. 201410305779.8, Chinese Office Action dated Mar. 1, 2016, 5 pages.
Foreign Communication From a Counterpart Application, PCT Application No. PCT/CN2015/075034, English Translation of International Search Report dated Jun. 16, 2015, 3 pages.
Foreign Communication From a Counterpart Application, PCT Application No. PCT/CN2015/075034, English Translation of Written Opinion dated Jun. 16, 2015, 8 pages.
Foreign Communication From a Counterpart Application, Indian Application No. 201647041982, Indian Examination Report dated Feb. 14, 2019, 6 pages.

* cited by examiner

THREE-PHASE UNINTERRUPTIBLE POWER SUPPLY CONTROL METHOD AND APPARATUS, AND THREE-PHASE UNINTERRUPTIBLE POWER SUPPLY RESPONSIVE TO ZERO WIRE LOSS

CROSS-REFERENCE TO RELATED APPLICATIONS

This application is a continuation application of international patent application number PCT/CN2015/075034 filed on Mar. 25, 2015, which claims priority to Chinese patent application number 201410305779.8 filed on Jun. 27, 2014, which are incorporated by reference.

TECHNICAL FIELD

The present disclosure relates to the field of power electronics technologies, and in particular, to a three-phase uninterruptible power supply control method and apparatus, and a three-phase uninterruptible power supply.

BACKGROUND

Inverter power supply systems are widely applied to various scenarios that require reliable power supply. For example, in the communications field, an inverter, an uninterruptible power supply (UPS), or the like is generally used to supply power to a key alternating current load, and a typical inverter power supply system is shown in FIG. 1. An inverter power supply generally has three power ports: a direct current (DC) battery input port, an alternating-current input port, and an alternating-current output port, and the ports correspond to three power converters: a DC/DC boost converter that boosts a low battery voltage to a high direct-current bus voltage, an alternating current (AC)/DC power factor correction (PFC) converter that converts a mains AC to a direct-current high-voltage bus and that completes input power factor correction, and a DC/AC inverter that converts a high-voltage direct current to an alternating current AC for output. A filter capacitor having a relatively large capacity is connected in parallel to a direct-current bus.

Input of a three-phase UPS is generally characterized by a three-phase four-wire mechanism plus a ground wire, that is, an A-phase wire, a B-phase wire, a C-phase wire, a zero wire, and a ground wire. When the three-phase UPS cannot receive a signal on a zero wire of an alternating-current power network, that is, the zero wire is lost, the three-phase UPS needs to be capable of detecting loss of the zero wire, and switch to a new control method, to ensure that the three-phase UPS can normally work with full load. After the zero wire is lost, if no measure is taken, a Neutral-ground voltage, that is, a difference between voltages of the ground wire and the zero wire, is very large, this voltage directly acts on a load and may damage the load. Moreover, after the zero wire is lost, because a middle point potential of positive and negative buses of the three-phase UPS are uncertain, the buses are probably unbalanced, that is, a difference between absolute values of voltages of the positive and negative buses is relatively large, and as a result, a voltage of one bus is excessively low and power-off is caused, which seriously affects reliability and a usage scope of the three-phase UPS.

Currently, when a PFC rectifier in a three-phase UPS has a two-level topology, after a zero wire is lost, a 0-axis reference current $i_0^*$ in a dq0 coordinate system is generally set to 0, then, a 0-axis current $i_0$ ($i_0=i_a+i_b+i_c)/3$) is sampled, where $i_a$ is an A-phase current of a three-phase alternating current received by the three-phase UPS, $i_b$ is a B-phase current of the three-phase alternating current received by the three-phase UPS, and $i_c$ is a C-phase current of the three-phase alternating current received by the three-phase UPS, to obtain a deviation $\Delta i_0=i_0-i_0^*$ between 0-axis currents. Proportional-integral (PI) adjustment, is performed on the obtained deviation $\Delta i_0$ between 0-axis currents, to generate a 0-axis direct-current modulated wave, where an amplitude of the 0-axis direct-current modulated wave is proportional to a Neutral-ground voltage. Therefore, the Neutral-ground voltage can be controlled within a particular range by limiting the amplitude of the 0-axis direct-current modulated wave.

However, if a PFC rectifier in a three-phase UPS has a three-level topology, after a zero wire is lost, if the current control method is used, a 0-axis direct-current modulated wave is equivalent to a direct-current voltage applied to a neutral point of a transverse bridge and a longitudinal bridge of the rectifier, and as a result, a current that flows through the transverse bridge in an alternating-current positive half cycle and a current that flows through the transverse bridge in an alternating-current negative half cycle are unequal; therefore, absolute values of voltages on positive and negative buses are unequal, and finally, a voltage of one bus is excessively low and power-off is caused.

In conclusion, after a zero wire is lost, when the current control method is applied to a three-phase UPS using a three-level topology, a 0-axis direct-current modulated wave results in that absolute values of voltages on positive and negative buses are unequal, and as a result, a voltage of a bus may be excessively low and power-off may be caused.

SUMMARY

Embodiments of the present disclosure provide a three-phase UPS control method and apparatus, and a three-phase uninterruptible power supply, to resolve a problem that after a zero wire is lost, when a current control method is applied to a three-phase UPS using a three-level topology, a 0-axis direct-current modulated wave results in that positive and negative buses are unbalanced.

According to a first aspect, a three-phase UPS control method is provided, including: determining that a zero wire of a three-phase uninterruptible power supply is lost; using an alternating current whose frequency is a harmonic frequency of mains as a 0-axis reference current; and generating a 0-axis modulated wave according to a difference between the 0-axis reference current and a 0-axis sampling current, to control a rectifier in the three-phase uninterruptible power supply to convert a received alternating current to a direct current, where at a same moment, the 0-axis sampling current is one third of a sum of an A-phase current, a B-phase current, and a C-phase current in a three-phase alternating current received by the three-phase uninterruptible power supply.

With reference to the first aspect, in a first possible implementation manner, the generating a 0-axis modulated wave according to a difference between the 0-axis reference current and a 0-axis sampling current includes: performing proportional adjustment on the difference between the 0-axis reference current and the 0-axis sampling current, so that a 0-axis current forms a closed loop, and when the zero wire of the three-phase uninterruptible power supply is normal, a location of a wave peak of each of an A-phase modulated wave, a B-phase modulated wave, and a C-phase modulated wave is the same as a location of a wave trough of the 0-axis reference current, and a location of a wave trough of the modulated wave is the same as a location of a wave peak of the 0-axis reference current, where a frequency of the 0-axis reference current is a $3N^{th}$-order harmonic frequency of the mains, and N is a natural number; and performing amplitude limiting on a difference between a 0-axis sampling voltage and a signal that is output after the proportional adjustment, to obtain the 0-axis modulated wave, where at a same moment, a voltage of the 0-axis modulated wave is equal to one third of a sum of a voltage of the A-phase modulated wave, a voltage of the B-phase modulated wave, and a voltage of the C-phase modulated wave.

With reference to the first aspect, in a second possible implementation manner, the determining that a zero wire of a three-phase uninterruptible power supply is lost includes: determining absolute values of average values of voltages of phases in the three-phase alternating current received by the three-phase uninterruptible power supply; and when a smallest value of the absolute values of the average values of the voltages of the phases in the three-phase alternating current is greater than a first threshold, determining that the zero wire of the three-phase uninterruptible power supply is lost.

With reference to the first aspect, in a third possible implementation manner, the method further includes: determining that the zero wire of the three-phase uninterruptible power supply recovers; and using, as the 0-axis reference current, a signal obtained after proportional integral is performed on a difference between a bus difference reference voltage and an actual bus difference, where the bus difference reference voltage is zero.

With reference to the third possible implementation manner of the first aspect, in a fourth possible implementation manner, the determining that the zero wire of the three-phase uninterruptible power supply recovers includes: determining a valid value of a current, on the zero wire, in the three-phase alternating current received by the three-phase uninterruptible power supply; and when the valid value of the current, on the zero wire, in the received three-phase alternating current is greater than a second threshold, determining that the zero wire of the three-phase uninterruptible power supply recovers.

According to a second aspect, a three-phase UPS control apparatus is provided, including: a determining module configured to determine that a zero wire of a three-phase uninterruptible power supply is lost; a setting module configured to use an alternating current whose frequency is a harmonic frequency of mains as a 0-axis reference current; and a generation module configured to generate a 0-axis modulated wave according to a difference between the 0-axis reference current and a 0-axis sampling current, to control a rectifier in the three-phase uninterruptible power supply to convert a received alternating current to a direct current, where at a same moment, the 0-axis sampling current is one third of a sum of an A-phase current, a B-phase current, and a C-phase current in a three-phase alternating current received by the three-phase uninterruptible power supply.

With reference to the second aspect, in a first possible implementation manner, the generation module is configured to: perform proportional adjustment on the difference between the 0-axis reference current and the 0-axis sampling current, so that a 0-axis current forms a closed loop, and when the zero wire of the three-phase uninterruptible power supply is normal, a location of a wave peak of each of an A-phase modulated wave, a B-phase modulated wave, and a C-phase modulated wave is the same as a location of a wave trough of the 0-axis reference current, and a location of a wave trough of the modulated wave is the same as a location of a wave peak of the 0-axis reference current, where a frequency of the 0-axis reference current is a $3N^{th}$-order harmonic frequency of the mains, and N is a natural number; and perform amplitude limiting on a difference between a 0-axis sampling voltage and a signal that is output after the proportional adjustment, to obtain the 0-axis modulated wave, where at a same moment, a voltage of the 0-axis modulated wave is equal to one third of a sum of a voltage of the A-phase modulated wave, a voltage of the B-phase modulated wave, and a voltage of the C-phase modulated wave.

With reference to the second aspect, in a second possible implementation manner, the determining module is configured to: determine absolute values of average values of voltages of phases in the three-phase alternating current received by the three-phase uninterruptible power supply; and when a smallest value of the absolute values of the average values of the voltages of the phases in the three-phase alternating current is greater than a first threshold, determine that the zero wire of the three-phase uninterruptible power supply is lost.

With reference to the second aspect, in a third possible implementation manner, the determining module is further configured to determine that the zero wire of the three-phase uninterruptible power supply recovers; and the setting module is further configured to use, as the 0-axis reference current, a signal obtained after proportional integral is performed on a difference between a bus difference reference voltage and an actual bus difference, where the bus difference reference voltage is zero.

With reference to the third possible implementation manner of the second aspect, in a fourth possible implementation manner, the determining module is configured to: determine a valid value of a current, on the zero wire, in the three-phase alternating current received by the three-phase uninterruptible power supply; and when the valid value of the current, on the zero wire, in the received three-phase alternating current is greater than a second threshold, determine that the zero wire of the three-phase uninterruptible power supply recovers.

According to a third aspect, a three-phase UPS is provided, including: a rectifier control unit configured to determine that a zero wire of a three-phase uninterruptible power supply is lost; use an alternating current whose frequency is a harmonic frequency of mains as a 0-axis reference current; and generate a 0-axis modulated wave according to a difference between the 0-axis reference current and a 0-axis sampling current, to control a rectifier in the three-phase uninterruptible power supply to convert a received alternating current to a direct current, where at a same moment, the 0-axis sampling current is one third of a sum of an A-phase current, a B-phase current, and a C-phase current in a three-phase alternating current received by the three-phase uninterruptible power supply; a rectifier configured to, under control of the rectifier control unit, convert the received three-phase alternating current to a direct current for output; and an inverter configured to convert, to an alternating current, the direct current output by the rectifier.

With reference to the third aspect, in a first possible implementation manner, the rectifier control unit is configured to: determine that the zero wire of the three-phase uninterruptible power supply is lost; use the alternating current whose frequency is a harmonic frequency of the mains as the 0-axis reference current, where N is a natural number; perform proportional adjustment on the difference between the 0-axis reference current and the 0-axis sampling current, so that a 0-axis current forms a closed loop, and when the zero wire of the three-phase uninterruptible power supply is normal, a location of a wave peak of each of an A-phase modulated wave, a B-phase modulated wave, and a C-phase modulated wave is the same as a location of a wave trough of the 0-axis reference current, and a location of a wave trough of the modulated wave is the same as a location of a wave peak of the 0-axis reference current; and perform amplitude limiting on a difference between a 0-axis sampling voltage and a signal that is output after the proportional adjustment, to obtain the 0-axis modulated wave, where the 0-axis sampling current is one third of the sum of the A-phase current, the B-phase current, and the C-phase current in the three-phase alternating current received by the three-phase uninterruptible power supply, and at a same moment, a voltage of the 0-axis modulated wave is equal to one third of a sum of a voltage of the A-phase modulated wave, a voltage of the B-phase modulated wave, and a voltage of the C-phase modulated wave.

With reference to the third aspect, in a second possible implementation manner, the rectifier control unit is configured to: determine absolute values of average values of voltages of phases in the three-phase alternating current received by the three-phase uninterruptible power supply; when a smallest value of the absolute values of the average values of the voltages of the phases in the three-phase alternating current is greater than a first threshold, determine that the zero wire of the three-phase uninterruptible power supply is lost; use the alternating current whose frequency is the harmonic frequency of the mains as the 0-axis reference current; and generate the 0-axis modulated wave according to the difference between the 0-axis reference current and the 0-axis sampling current, to control the rectifier in the three-phase uninterruptible power supply to convert a received alternating current to a direct current, where the 0-axis sampling current is one third of the sum of the A-phase current, the B-phase current, and the C-phase current in the three-phase alternating current received by the three-phase uninterruptible power supply.

With reference to the third aspect, in a third possible implementation manner, the rectifier control unit is further configured to: determine that the zero wire of the three-phase uninterruptible power supply recovers, and use, as the 0-axis reference current, a signal obtained after proportional integral is performed on a difference between a bus difference reference voltage and an actual bus difference, where the bus difference reference voltage is zero.

With reference to the third possible implementation manner of the third aspect, in a fourth possible implementation manner, the rectifier control unit is configured to: determine a valid value of a current, on the zero wire, in the three-phase alternating current received by the three-phase uninterruptible power supply; when the valid value of the current, on the zero wire, in the received three-phase alternating current is greater than a second threshold, determine that the zero wire of the three-phase uninterruptible power supply recovers; and use, as the 0-axis reference current, the signal obtained after proportional integral is performed on the difference between the bus difference reference voltage and the actual bus difference.

Beneficial effects of the embodiments of the present disclosure include: According to the three-phase UPS control method and apparatus, and the three-phase UPS provided in the embodiments of the present disclosure, after a zero wire is lost, an alternating current whose frequency is a harmonic frequency of mains is used as a 0-axis reference current, and a 0-axis modulated wave is then generated according to a difference between the 0-axis reference current and a 0-axis sampling current, to control a rectifier in the three-phase uninterruptible power supply to convert a received alternating current to a direct current. Because the 0-axis reference current and the 0-axis sampling current are both alternating, the 0-axis modulated wave generated according to the difference between the 0-axis reference current and the 0-axis sampling current is also alternating, and is equivalent to an alternating-current voltage applied to a neutral point of a transverse bridge and a longitudinal bridge of the rectifier. Because the alternating-current voltage is a mains harmonic, an average value of alternating-current voltages within a mains cycle is 0. Therefore, a current that flows through the transverse bridge in an alternating-current positive half cycle and a current that flows through the transverse bridge in an alternating-current negative half cycle are equal, and positive and negative buses in the three-phase UPS are balanced, thereby resolving a problem that positive and negative buses are unbalanced.

DESCRIPTION OF EMBODIMENTS

According to a three-phase UPS control method and apparatus, and an uninterruptible power supply provided in the embodiments of the present disclosure, after a zero wire is lost, a 0-axis reference current is set to an alternating current whose frequency is a harmonic frequency of mains, and a 0-axis modulated wave is then generated according to a difference between the 0-axis reference current and a 0-axis sampling current. Because the 0-axis reference current and the 0-axis sampling current are both alternating, the 0-axis modulated wave generated according to the difference between the 0-axis reference current and the 0-axis sampling current is also alternating. Therefore, a current that flows through a transverse bridge in an alternating-current positive half cycle and a current that flows through the transverse bridge in an alternating-current negative half cycle are equal, and positive and negative buses in the three-phase UPS are balanced, thereby resolving a problem that positive and negative buses are unbalanced.

Specific implementation manners of the three-phase UPS control method and apparatus, and the three-phase UPS provided in the embodiments of the present disclosure are described below with reference to the accompanying drawings of this specification.

Figure 1:
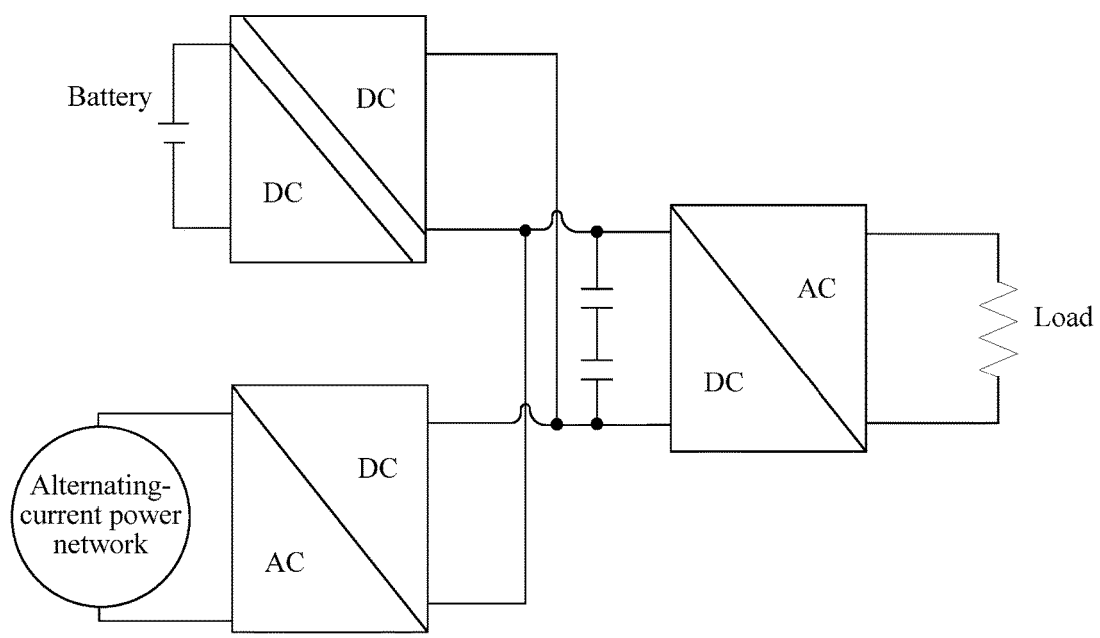
FIG. 1 is a schematic structural diagram of an inverter power supply system.
Figure 2:
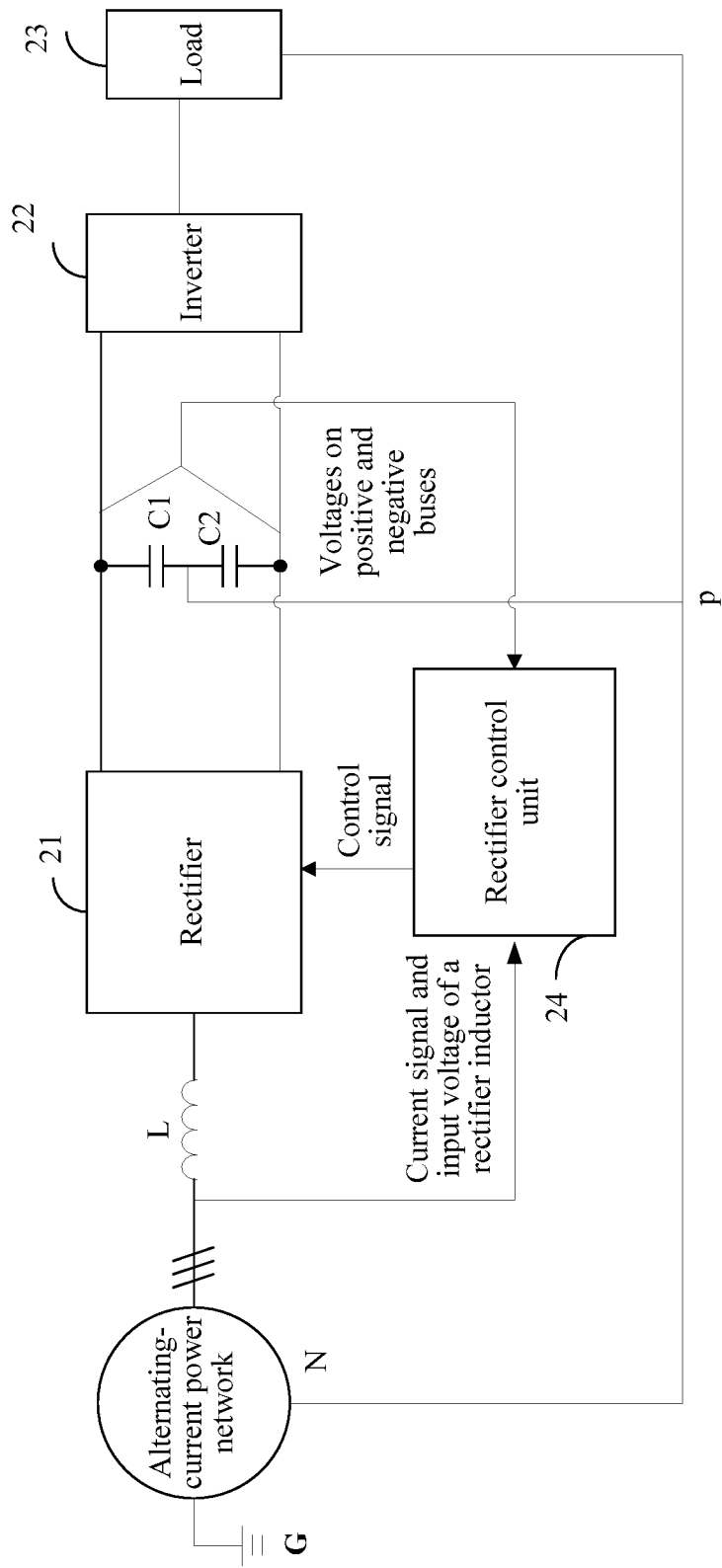
FIG. 2 is a schematic structural diagram of an uninterruptible power supply system according to an embodiment of the present disclosure.

The three-phase UPS control method provided in the embodiments of the present disclosure is applied to a UPS system shown in FIG. 2, where a rectifier 21, an inverter 22, a bus capacitor C1, a bus capacitor C2, and a rectifier inductor L form a UPS. A rectifier control unit 24 generates a modulated wave according to a current signal of the rectifier inductor L, an input voltage (that is, a received voltage of an alternating current power network), and voltages of positive and negative buses, and then generates a control signal according to the generated modulated wave, to control the rectifier 21 to work. A load 23 is further included in FIG. 2. Actually, the three-phase UPS includes three rectifier inductors and three rectifiers, and a three-phase alternating current is input to different rectifiers by means of different rectifier inductors.

Figure 3:
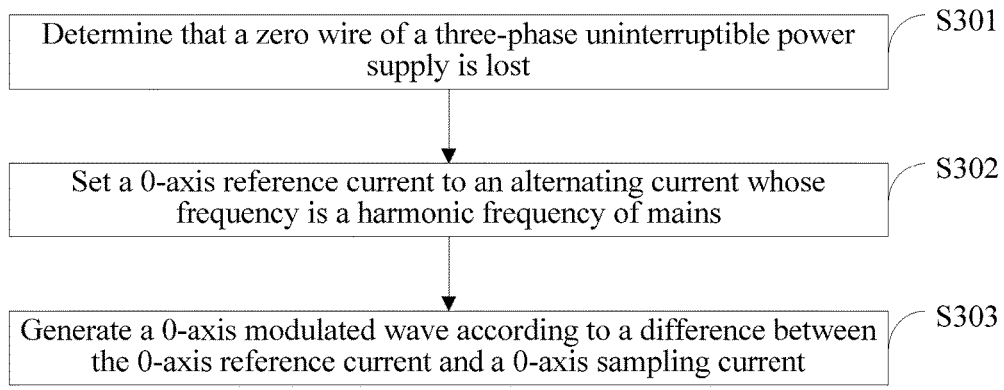
FIG. 3 is a first flowchart of a three-phase uninterruptible power supply control method according to an embodiment of the present disclosure.

As shown in FIG. 3, a three-phase UPS control method provided in an embodiment of the present disclosure includes:

S301. Determine that a zero wire of a three-phase uninterruptible power supply is lost.

S302. Use an alternating current whose frequency is a harmonic frequency of mains as a 0-axis reference current.

S303. Generate a 0-axis modulated wave according to a difference between the 0-axis reference current and a 0-axis sampling current, to control a rectifier in the three-phase uninterruptible power supply to convert a received alternating current to a direct current.

At a same moment, the 0-axis sampling current $i_0$ is one third of a sum of an A-phase current $i_a$ (that is, a current on a rectifier inductor connected to a rectifier that rectifies an A-phase alternating current in the three-phase UPS), a B-phase current $i_b$ (that is, a current on a rectifier inductor connected to a rectifier that rectifies a B-phase alternating current in the three-phase UPS), and a C-phase current $i_c$ (that is, a current on a rectifier inductor connected to a rectifier that rectifies a C-phase alternating current in the three-phase UPS) in a three-phase alternating current received by the three-phase UPS, that is, $i_0=(i_a+i_b+i_c)/3$.

Zero wire loss refers to that a zero wire between an alternating current power network and a p point in FIG. 2 is disconnected. A mains frequency is f (=50 hertz (Hz)). Therefore, a frequency of the 0-axis reference current is n*f, where N is a natural number.

The 0-axis may be a 0 axis in a rotating coordinate system αβ0, or may be a 0 axis in a rotating coordinate system dq0. If the 0 axis is a 0 axis in the rotating coordinate system αβ0, after the 0-axis modulated wave is generated, coordinate conversion is then performed on an α-axis modulated wave, a β-axis modulated wave, and the generated 0-axis modulated wave, to generate an A-phase modulated wave, a B-phase modulated wave, and a C-phase modulated wave. If the 0 axis is a 0 axis in the rotating coordinate system dq0, after the 0-axis modulated wave is generated, coordinate conversion is then performed on a d-axis modulated wave, a q-axis modulated wave, and the generated 0-axis modulated wave, to generate an A-phase modulated wave, a B-phase modulated wave, and a C-phase modulated wave. A voltage of the 0-axis modulated wave is $U_0=(U_{sA}+U_{sB}+U_{sC})/3$, where $U_{sA}$ is a voltage of the A-phase modulated wave, $U_{sB}$ is a voltage of the B-phase modulated wave, and $U_{sC}$ is a voltage of the C-phase modulated wave.

The A-phase modulated wave controls a rectifier, which receives an A-phase alternating current in the three-phase UPS, to convert the received alternating current to a direct current, the B-phase modulated wave controls a rectifier, which receives a B-phase alternating current in the three-phase UPS, to convert the received alternating current to a direct current, and the C-phase modulated wave controls a rectifier, which receives a C-phase alternating current in the three-phase UPS, to convert the received alternating current to a direct current.

When the three-phase UPS control method provided in this embodiment of the present disclosure is used, a rectifier in the three-phase UPS may use a two-level topology, may use a three-level topology, or may use another topology.

Figure 4:
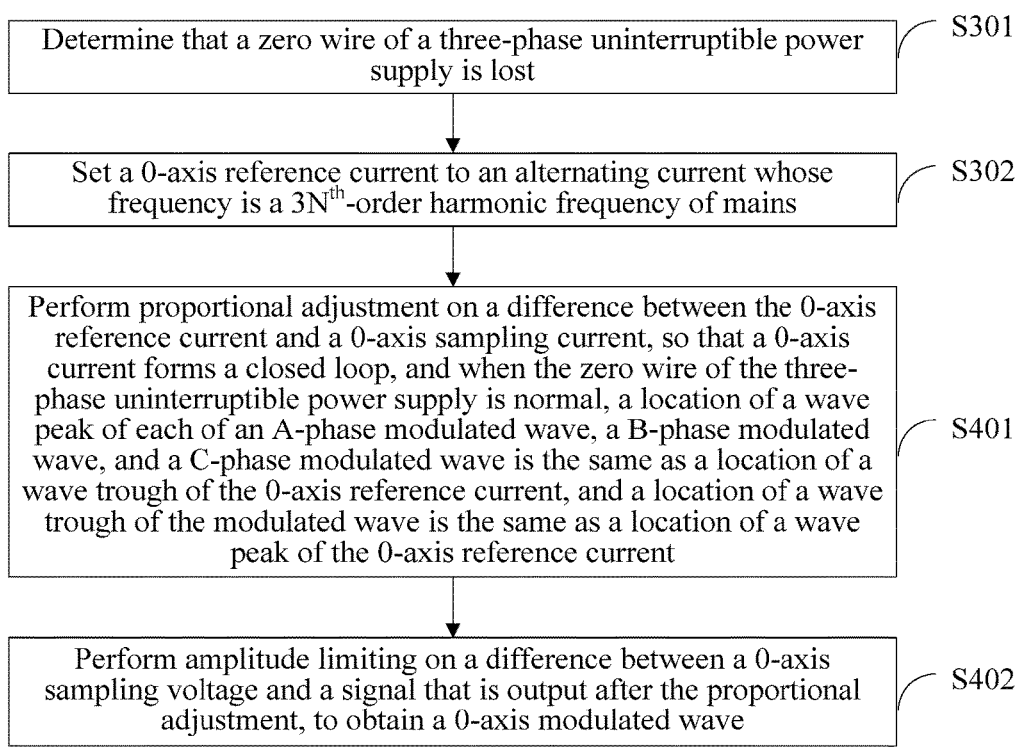
FIG. 4 is a second flowchart of a three-phase uninterruptible power supply control method according to an embodiment of the present disclosure.

Optionally, as shown in FIG. 4, the generating a 0-axis modulated wave according to a difference between the 0-axis reference current and a 0-axis sampling current includes:

S401. Perform proportional adjustment on the difference between the 0-axis reference current and the 0-axis sampling current, so that a 0-axis current forms a closed loop, and when the zero wire of the three-phase uninterruptible power supply is normal, a location of a wave peak of each of an A-phase modulated wave, a B-phase modulated wave, and a C-phase modulated wave is the same as a location of a wave trough of the 0-axis reference current, and a location of a wave trough of the modulated wave is the same as a location of a wave peak of the 0-axis reference current, where a frequency of the 0-axis reference current is a $3N^{th}$-order harmonic frequency of the mains, and N is a natural number.

S402. Perform amplitude limiting on a difference between a 0-axis sampling voltage and a signal that is output after the proportional adjustment, to obtain the 0-axis modulated wave.

At a same moment, the voltage $U_0$ of the 0-axis modulated wave is equal to one third of a sum of the voltage $U_{sA}$ of the A-phase modulated wave, the voltage $U_{sB}$ of the B-phase modulated wave, and the voltage $U_{sC}$ of the C-phase modulated wave, that is, $U_0=(U_{sA}+U_{sB}+U_{sC})/3$.

A 0-axis sampling voltage $V_0$ is equal to one third of a sum of an input voltage $U_a$ of the A-phase alternating current in the three-phase alternating current received by the three-phase UPS, an input voltage $U_b$ of the B-phase alternating current in the three-phase alternating current received by the three-phase UPS, and an input voltage $U_c$ of the C-phase alternating current in the three-phase alternating current received by the three-phase UPS, that is, $V_0=(U_a+U_b+U_c)/3$.

When the frequency of the 0-axis reference current is the $3N^{th}$-order harmonic frequency of the mains, a phase of the 0-axis reference current, an amplitude of the 0-axis reference current, and a proportion during proportional adjustment on the difference between the 0-axis reference current and the 0-axis sampling current are adjusted, so that the 0-axis current forms a closed loop, that is, the 0-axis current forms a negative feedback, and when the zero wire of the three-phase uninterruptible power supply is normal, a location of a wave peak of each of the A-phase modulated wave, the B-phase modulated wave, and the C-phase modulated wave is the same as a location of a wave trough of the 0-axis reference current, and a location of a wave trough of the modulated wave is the same as a location of a wave peak of the 0-axis reference current. In this way, a wave peak of each of the A-phase modulated wave, the B-phase modulated wave, and the C-phase modulated wave that are obtained after the 0-axis reference current is superposed falls, and a wave trough of each of the A-phase modulated wave, the B-phase modulated wave, and the C-phase modulated wave that are obtained after the 0-axis reference current is superposed rises, avoiding that a wave peak of a modulated wave is higher than a wave peak of a carrier, and that a wave trough of a modulated wave is lower than a wave trough of a carrier.

Figure 5:
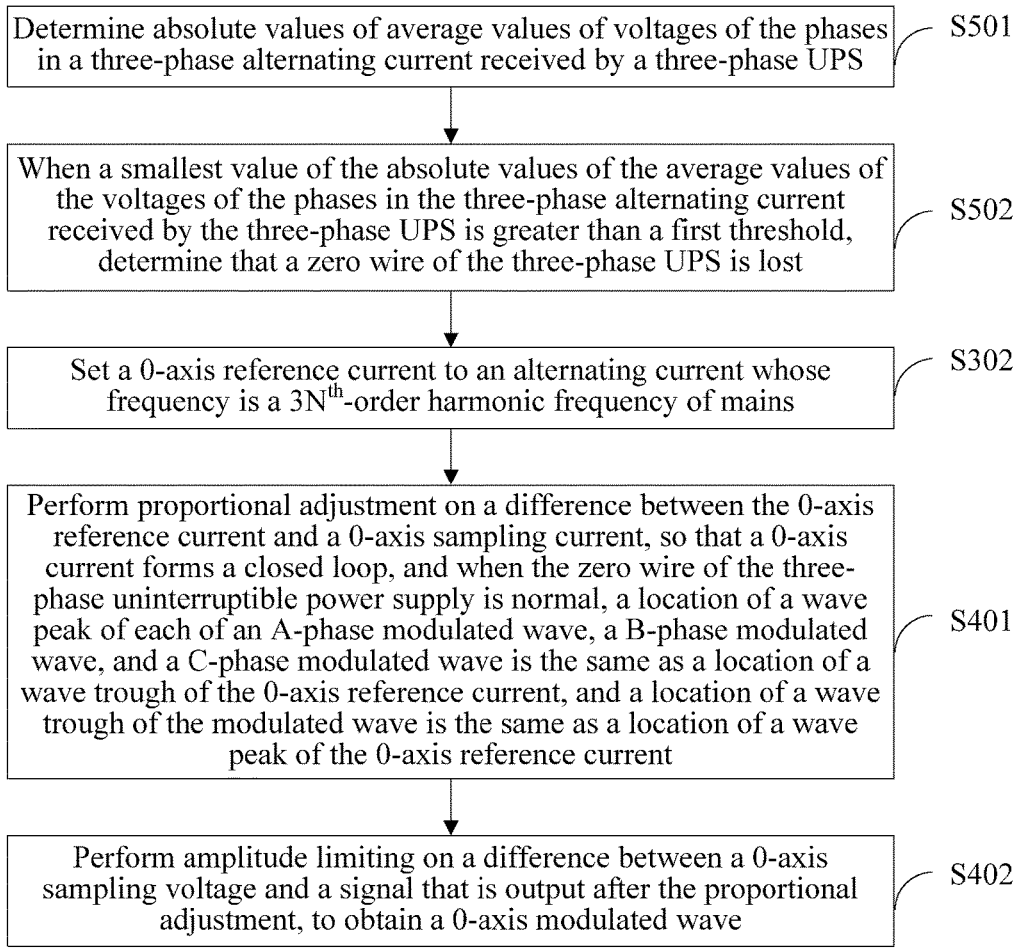
FIG. 5 is a third flowchart of a three-phase uninterruptible power supply control method according to an embodiment of the present disclosure.

Optionally, as shown in FIG. 5, the determining that a zero wire of a three-phase UPS is lost includes:

S501. Determine absolute values of average values of voltages of phases in the three-phase alternating current received by the three-phase UPS.

$\overline{U_a} = \int_t^{t+T} U_a dt$ is an average value of voltages of the A-phase alternating current in the three-phase alternating current received by the three-phase UPS, where $U_a$ is an instantaneous value of the voltage of the A-phase alternating current in the three-phase alternating current received by the three-phase UPS; $\overline{U_b} = \int_t^{t+T} U_b dt$ is an average value of voltages of the B-phase alternating current in the three-phase alternating current received by the three-phase UPS, where $U_b$ is an instantaneous value of the voltage of the B-phase alternating current in the three-phase alternating current received by the three-phase UPS; and $\overline{U_c} = \int_t^{t+T} U_c dt$ an average value of voltages of the C-phase alternating current in the three-phase alternating current received by the three-phase UPS, where $U_c$ is an instantaneous value of the voltage of the C-phase alternating current in the three-phase alternating current received by the three-phase UPS, and T is a mains cycle.

S502. When a smallest value of the absolute values of the average values of the voltages of the phases in the three-phase alternating current received by the three-phase UPS is greater than a first threshold, determine that the zero wire of the three-phase UPS is lost.

If $\overline{U_{NGmin}} = \min\{|\overline{U_a}|, |\overline{U_b}|, |\overline{U_c}|\}$, when $\overline{U_{NGmin}}$ is greater than the first threshold, it is determined that the zero wire of the three-phase UPS is lost.

Figure 6:
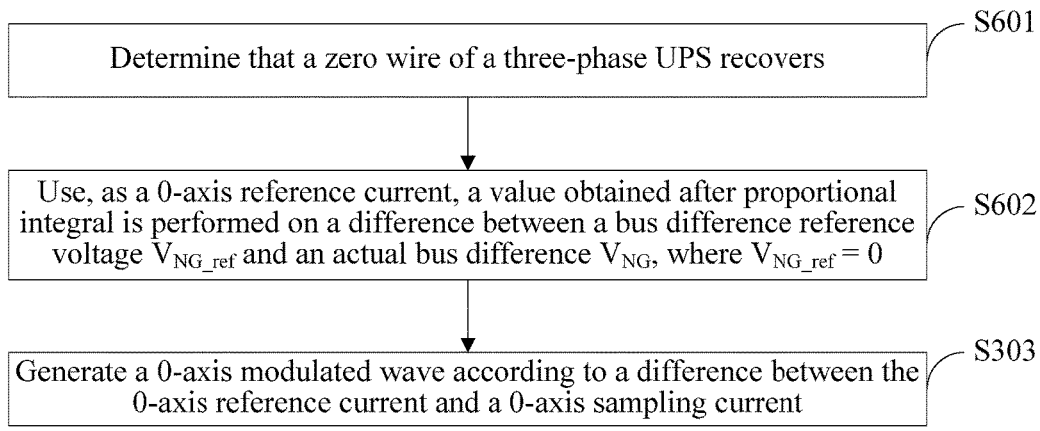
FIG. 6 is a fourth flowchart of a three-phase uninterruptible power supply control method according to an embodiment of the present disclosure.

Optionally, as shown in FIG. 6, the three-phase UPS control method provided in this embodiment of the present disclosure further includes:

S601. Determine that the zero wire of the three-phase UPS recovers, that is, a zero wire between an alternating current power network and a p point in FIG. 2 is connected.

S602. Use, as the 0-axis reference current, a signal obtained after proportional integral is performed on a difference between a bus difference reference voltage $V_{NG\_ref}$ and an actual bus difference $V_{NG}$, where the bus difference reference voltage $V_{NG\_ref}$ is zero, that is, $V_{NG\_ref}=0$; and then, generate the 0-axis modulated wave according to the difference between the 0-axis reference current and the 0-axis sampling current.

The actual bus difference is $V_{busP}-V_{busN}$, $V_{busP}$ is a voltage on a positive bus capacitor, and $V_{busN}$ is a voltage on a negative bus capacitor.

Figure 7:
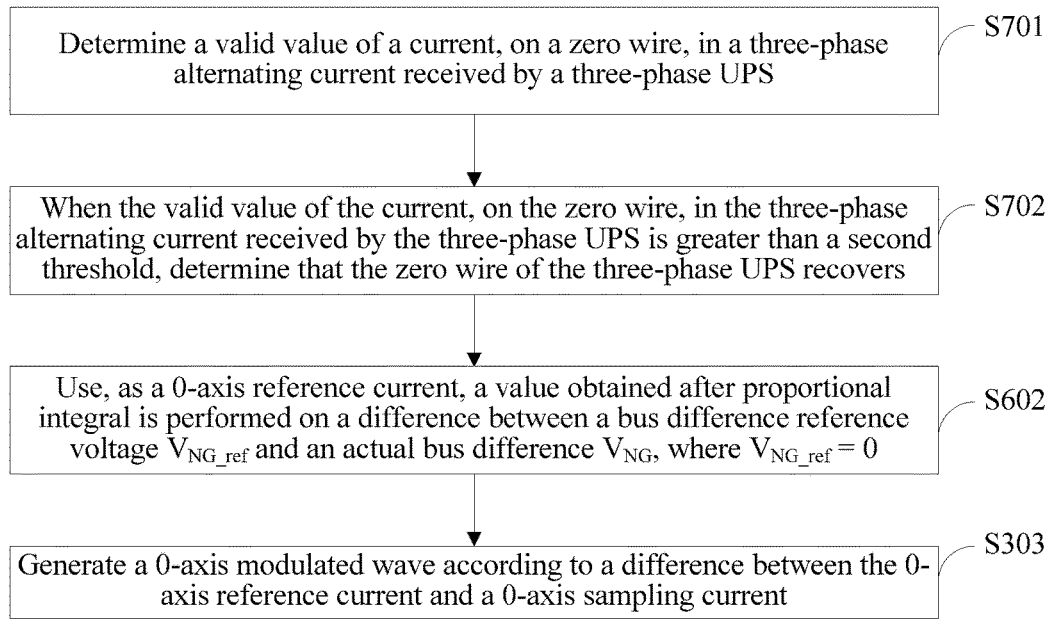
FIG. 7 is a fifth flowchart of a three-phase uninterruptible power supply control method according to an embodiment of the present disclosure.

When the zero wire is connected, a valid value of a current on the zero wire is obviously relatively large; therefore, optionally, as shown in FIG. 7, the determining that the zero wire of the three-phase UPS recovers includes:

S701. Determine a valid value of a current, on the zero wire, in the three-phase alternating current received by the three-phase UPS.

The valid value of the current, on the zero wire, in the three-phase alternating current received by the three-phase UPS is $$I_{N\_RECrms} = \sqrt{\frac{1}{T}\int_t^{t+T} I_{N\_REC}^2 dt},$$

where $I_{N\_REC}$ is an instantaneous value of the current, on the zero wire, in the three-phase alternating current received by the three-phase UPS, $I_{N\_REC}=I_{LA}+I_{LB}+I_{LC}$, $I_{LA}$ is an instantaneous value of the current on the rectifier inductor connected to the rectifier that rectifies the A-phase alternating current in the three-phase UPS, $I_{LB}$ is an instantaneous value of the current on the rectifier inductor connected to the rectifier that rectifies the B-phase alternating current in the three-phase UPS and $I_{LC}$ is an instantaneous value of the current on the rectifier inductor connected to the rectifier that rectifies the C-phase alternating current in the three-phase UPS.

S702. When the valid value of the current, on the zero wire, in the three-phase alternating current received by the three-phase UPS is greater than a second threshold, determine that the zero wire of the three-phase UPS recovers.

Figure 8:
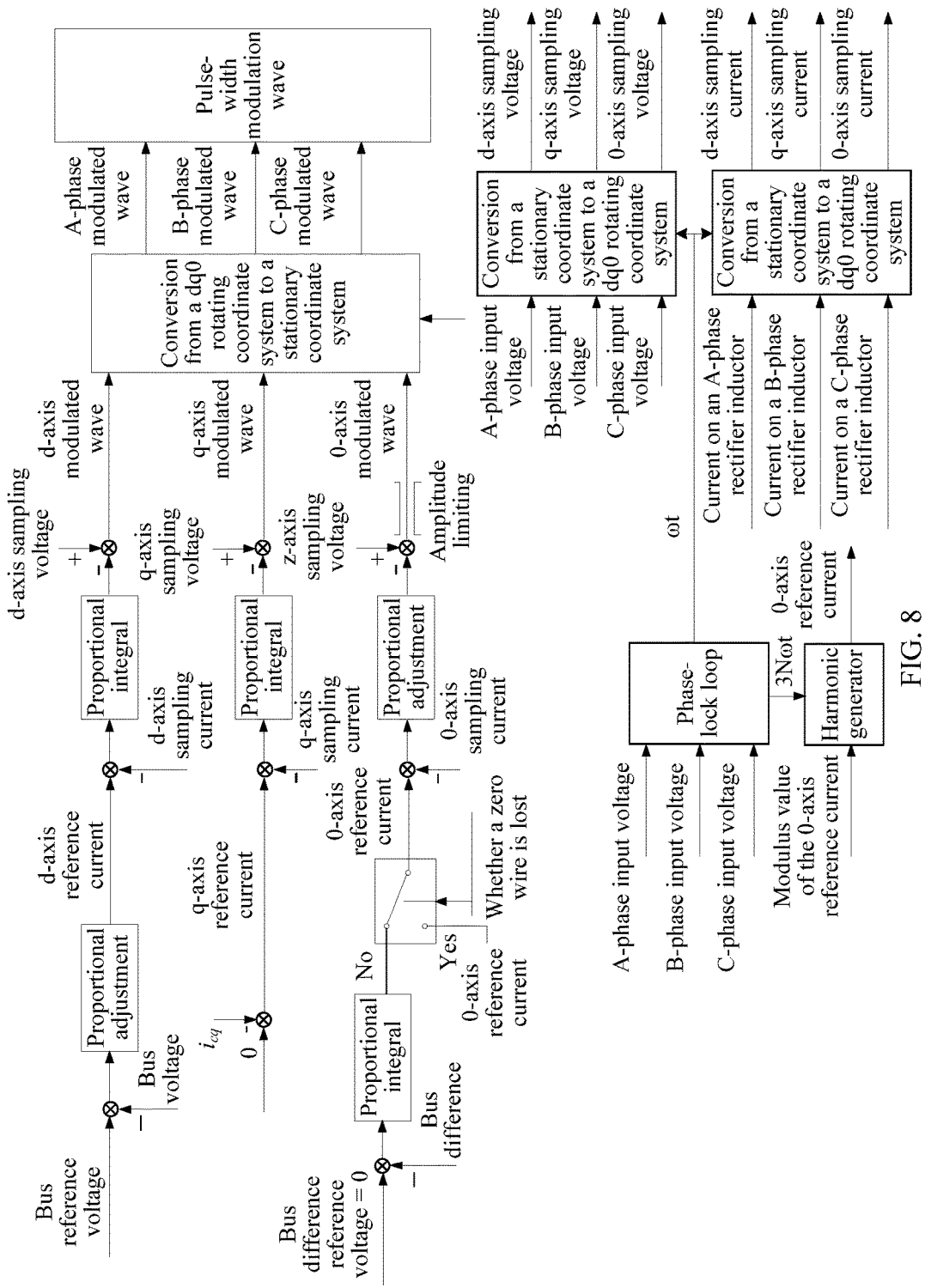
FIG. 8 is a schematic diagram of a control logic when a three-phase uninterruptible power supply control method is actually applied according to an embodiment of the present disclosure.

An actual application of the three-phase UPS control method provided in this embodiment of the present disclosure is shown in FIG. 8, and FIG. 8 describes an example in which a rectifier in the three-phase UPS is controlled in a dq0 coordinate system. Bus voltage control is implemented on a d axis in the dq0 coordinate system, which includes: performing proportional adjustment on a difference between a bus reference voltage and a bus voltage to control the bus voltage, performing proportional integral on a difference between a d-axis reference current and a d-axis sampling current that are output after proportional adjustment, and determining a d-axis modulated wave according to a d-axis sampling voltage and a signal that is output after proportional integral. Reactive current control is implemented on a q axis in the dq0 coordinate system, which aims to offset impact of a rectifying filter capacitor on a power factor at a power network end, so that the power factor approaches 1, and which includes: generating a q-axis reference current according to a slightly-adjusted-amount $i_{cq}$ on the q-axis and a given value (=0) of the slightly-adjusted-amount on the q-axis, performing proportional integral on a difference between a q-axis reference current and a q-axis sampling current, and determining a q-axis modulated wave according to a q-axis sampling voltage and a signal that is output after proportional integral. Bus difference steady-state control is implemented on the 0-axis, and in a UPS system in which a middle point of a bus capacitor is connected to a zero wire of a power network, positive and negative buses can be balanced. When the zero wire is not lost, proportional integral is performed on a difference between an actual bus difference and a bus difference reference voltage, a signal output after proportional integral is used as the 0-axis reference current, proportional adjustment is performed on the difference between the 0-axis reference current and the 0-axis sampling current, amplitude limiting is performed on a difference between a 0-axis sampling voltage and a signal that is output after the proportional adjustment, to obtain the 0-axis modulated wave. When the zero wire is lost, a harmonic generator generates the 0-axis reference current according to a given modulus value of the 0-axis reference current and a phase that is output by a phase-lock loop, proportional adjustment is then performed on the difference between the 0-axis reference current and the 0-axis sampling current, and amplitude limiting is performed on a difference between a 0-axis sampling voltage and a signal that is output after the proportional adjustment, to obtain the 0-axis modulated wave. Finally, coordinate conversion from the dq0 rotating coordinate system to a stationary coordinate system is performed on the d-axis modulated wave, the q-axis modulated wave, and the 0-axis modulated wave, to obtain the A-phase modulated wave, the B-phase modulated wave, and the C-phase modulated wave, and pulse-width modulation is performed on the A-phase modulated wave, the B-phase modulated wave, and the C-phase modulated wave to respectively obtain a control signal of the rectifier that receives the A-phase alternating current in the three-phase UPS, a control signal of the rectifier that receives the B-phase alternating current in the three-phase UPS, and a control signal of the rectifier that receives the C-phase alternating current in the three-phase UPS.

The d-axis sampling current, the q-axis sampling current, and the 0-axis sampling current are obtained after conversion from a stationary coordinate system to the dq0 rotating coordinate system is performed on a current (an A-phase input current) on the rectifier inductor connected to the rectifier that rectifies the A-phase alternating current in the three-phase UPS, a current (a B-phase input current) on the rectifier inductor connected to the rectifier that rectifies the B-phase alternating current in the three-phase UPS, and a current (a C-phase input current) on the rectifier inductor connected to the rectifier that rectifies the C-phase alternating current in the three-phase UPS. The d-axis sampling voltage, the q-axis sampling voltage, and the 0-axis sampling voltage are obtained after conversion from a stationary coordinate system to the dq0 rotating coordinate system is performed on an A-phase input voltage received by the three-phase UPS, a B-phase input voltage received by the three-phase UPS, and a C-phase input voltage received by the three-phase UPS. An angle involved in conversion from the stationary coordinate system to the dq0 rotating coordinate system or conversion from the dq0 rotating coordinate system to the stationary coordinate system is an included angle between a direct axis and an A-phase input voltage, the angle is obtained by a phase-lock loop according to an A-phase input voltage, a B-phase input voltage, and a C-phase input voltage that are received by the three-phase UPS, and moreover, the phase-lock loop further provides a phase of the 0-axis reference current.

Based on the same inventive idea, the embodiments of the present disclosure further provide a three-phase UPS control apparatus and a three-phase UPS. Because problem resolving principles of the apparatus and the three-phase UPS are similar to that of the foregoing three-phase UPS control method, for implementation of the apparatus and the three-phase UPS, refer to implementation of the foregoing method, and a repeated part is no longer described in detail again.

Figure 9:
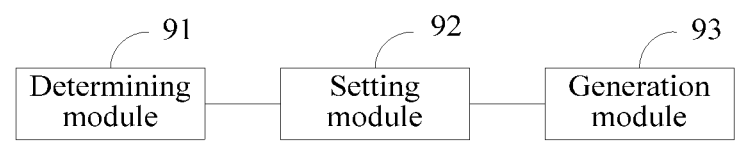
FIG. 9 is a structural diagram of a three-phase uninterruptible power supply control apparatus according to an embodiment of the present disclosure.

As shown in FIG. 9, a three-phase UPS control apparatus provided in an embodiment of the present disclosure includes: a determining module 92 configured to determine that a zero wire of a three-phase uninterruptible power supply is lost; a setting module 92 configured to use an alternating current whose frequency is a harmonic frequency of mains as a 0-axis reference current; and a generation module 93 configured to generate a 0-axis modulated wave according to a difference between the 0-axis reference current and a 0-axis sampling current, to control a rectifier in the three-phase uninterruptible power supply to convert a received alternating current to a direct current, where at a same moment, the 0-axis sampling current is one third of a sum of an A-phase current, a B-phase current, and a C-phase current in a three-phase alternating current received by the three-phase uninterruptible power supply.

Optionally, the generation module 93 is configured to perform proportional adjustment on the difference between the 0-axis reference current and the 0-axis sampling current, so that a 0-axis current forms a closed loop, and when the zero wire of the three-phase uninterruptible power supply is normal, a location of a wave peak of each of an A-phase modulated wave, a B-phase modulated wave, and a C-phase modulated wave is the same as a location of a wave trough of the 0-axis reference current, and a location of a wave trough of the modulated wave is the same as a location of a wave peak of the 0-axis reference current, where a frequency of the 0-axis reference current is a $3N^{th}$-order harmonic frequency of the mains, and N is a natural number; and perform amplitude limiting on a difference between a 0-axis sampling voltage and a signal that is output after the proportional adjustment, to obtain the 0-axis modulated wave, where at a same moment, a voltage of the 0-axis modulated wave is equal to one third of a sum of a voltage of the A-phase modulated wave, a voltage of the B-phase modulated wave, and a voltage of the C-phase modulated wave.

Optionally, the determining module 91 is configured to determine absolute values of average values of voltages of phases in the three-phase alternating current received by the three-phase uninterruptible power supply; and when a smallest value of the absolute values of the average values of the voltages of the phases in the three-phase alternating current is greater than a first threshold, determine that the zero wire of the three-phase uninterruptible power supply is lost.

Optionally, the determining module 91 is further configured to determine that the zero wire of the three-phase uninterruptible power supply recovers, and the setting module 92 is further configured to use, as the 0-axis reference current, a signal obtained after proportional integral is performed on a difference between a bus difference reference voltage and an actual bus difference, where the bus difference reference voltage is zero.

Optionally, the determining module 91 is configured to determine a valid value of a current, on the zero wire, in the three-phase alternating current received by the three-phase uninterruptible power supply; and when the valid value of the current, on the zero wire, in the received three-phase alternating current is greater than a second threshold, determine that the zero wire of the three-phase uninterruptible power supply recovers.

As shown in FIG. 2, a three-phase uninterruptible power supply provided in an embodiment of the present disclosure includes: a rectifier control unit 24 configured to determine that a zero wire of a three-phase uninterruptible power supply is lost, use an alternating current whose frequency is a harmonic frequency of mains as a 0-axis reference current; and generate a 0-axis modulated wave according to a difference between the 0-axis reference current and a 0-axis sampling current, to control a rectifier in the three-phase uninterruptible power supply to convert a received alternating current to a direct current, where at a same moment, the 0-axis sampling current is one third of a sum of an A-phase current, a B-phase current, and a C-phase current in a three-phase alternating current received by the three-phase uninterruptible power supply; a rectifier 21 configured to: under control of the rectifier control unit 24, convert the received three-phase alternating current to a direct current for output; and an inverter 22 configured to convert, to an alternating current, the direct current output by the rectifier 21.

Optionally, the rectifier control unit 24 is configured to determine that the zero wire of the three-phase uninterruptible power supply is lost; use the alternating current whose frequency is a $3N^{th}$-order harmonic frequency of the mains as the 0-axis reference current, where N is a natural number; perform proportional adjustment on the difference between the 0-axis reference current and the 0-axis sampling current, so that a 0-axis current forms a closed loop, and when the zero wire of the three-phase uninterruptible power supply is normal, a location of a wave peak of each of an A-phase modulated wave, a B-phase modulated wave, and a C-phase modulated wave is the same as a location of a wave trough of the 0-axis reference current, and a location of a wave trough of the modulated wave is the same as a location of a wave peak of the 0-axis reference current; and perform amplitude limiting on a difference between a 0-axis sampling voltage and a signal that is output after the proportional adjustment, to obtain the 0-axis modulated wave, where the 0-axis sampling current is one third of the sum of the A-phase current, the B-phase current, and the C-phase current in the three-phase alternating current received by the three-phase uninterruptible power supply, and at a same moment, a voltage of the 0-axis modulated wave is equal to one third of a sum of a voltage of the A-phase modulated wave, a voltage of the B-phase modulated wave, and a voltage of the C-phase modulated wave.

Optionally, the rectifier control unit 24 is configured to determine absolute values of average values of voltages of phases in the three-phase alternating current received by the three-phase uninterruptible power supply; when a smallest value of the absolute values of the average values of the voltages of the phases in the three-phase alternating current is greater than a first threshold, determine that the zero wire of the three-phase uninterruptible power supply is lost; use the alternating current whose frequency is the harmonic frequency of the mains as the 0-axis reference current; and generate the 0-axis modulated wave according to the difference between the 0-axis reference current and the 0-axis sampling current, to control the rectifier in the three-phase uninterruptible power supply to convert a received alternating current to a direct current, where the 0-axis sampling current is one third of the sum of the A-phase current, the B-phase current, and the C-phase current in the three-phase alternating current received by the three-phase uninterruptible power supply.

Optionally, the rectifier control unit 24 is further configured to determine that the zero wire of the three-phase uninterruptible power supply recovers, and use, as the 0-axis reference current, a signal obtained after proportional integral is performed on a difference between a bus difference reference voltage and an actual bus difference, where the bus difference reference voltage is zero.

Optionally, the rectifier control unit 24 is configured to determine a valid value of a current, on the zero wire, in the three-phase alternating current received by the three-phase uninterruptible power supply; when the valid value of the current, on the zero wire, in the received three-phase alternating current is greater than a second threshold, determine that the zero wire of the three-phase uninterruptible power supply recovers; and use, as the 0-axis reference current, the signal obtained after proportional integral is performed on the difference between the bus difference reference voltage and the actual bus difference.

Based on the foregoing descriptions of the embodiments, a person skilled in the art may clearly understand that the present disclosure may be implemented by hardware or by software in addition to a necessary general hardware platform. Based on such understanding, the technical solutions of the embodiments of the present disclosure may be implemented in a form of a software product. The software product may be stored in a non-volatile storage medium (which may be a compact disc read-only memory (CD-ROM), a Universal Serial Bus (USB) flash drive, or the like) and includes several instructions for instructing a computer device (which may be a personal computer, a server, a network device, or the like) to perform the methods in the embodiments of the present disclosure.

A person skilled in the art may understand that the accompanying drawings are merely schematic diagrams of exemplary embodiments, and modules or processes in the accompanying drawings are not necessarily required for implementing the present disclosure.

A person skilled in the art may understand that the modules in the apparatuses provided in the embodiments may be arranged in the apparatuses in a distributed manner according to the description of the embodiments, or may be arranged in one or more apparatuses which are different from those described in the embodiments. The modules in the foregoing embodiments may be combined into one module, or split into a plurality of submodules.

The sequence numbers of the foregoing embodiments of the present disclosure are merely for illustrative purposes, and are not intended to indicate priorities of the embodiments.

Obviously, a person skilled in the art can make various modifications and variations to the present disclosure without departing from the scope of the present disclosure. The present disclosure is intended to cover these modifications and variations provided that they fall within the scope of protection defined by the following claims and their equivalent technologies.

What is claimed is:

1. A three-phase uninterruptible power supply (UPS) control method for controlling a three-phase UPS comprising a three-phase rectifier configured to receive three-phase alternating current (AC) power from a three-phase AC power network, the three-phase AC power including an A-phase current, a B-phase current, and a C-phase current, wherein a zero wire of the three-phase AC power network is coupled to the three-phase UPS, the method comprising:
using an AC signal whose frequency is a harmonic frequency the three-phase AC power network as a 0-axis reference current when the zero wire is lost;
calculating a 0-axis sampling current as one third of a sum of the A-phase current, the B-phase current, and the C-phase current received by the rectifier;
generating a 0-axis modulated wave, with respect to a rotating coordinate system, based on a difference between the 0-axis reference current and the 0-axis sampling current; and
outputting a control signal based on the 0-axis modulated wave to control the rectifier to convert the three-phase AC power to a direct current.

2. The method of claim 1, wherein the generating comprises performing a proportional adjustment on the difference so that:
locations of wave peaks of an A-phase modulated wave, a B-phase modulated wave, and a C-phase modulated wave derived based on the 0-axis modulated wave are the same as a location of a wave trough of the 0-axis reference current when the zero wire is normal; and
locations of wave troughs of the A-phase modulated wave, the B-phase modulated wave, and the C-phase modulated wave are the same as a location of a wave peak of the 0-axis reference current when the zero wire is normal, wherein the frequency of the 0-axis reference current is a 3Nth-order harmonic frequency of the three-phase AC power network, and wherein N is a natural number.

3. The method of claim 2, wherein the generating further comprises performing amplitude limiting on a difference between a 0-axis sampling voltage and a signal that is output after the proportional adjustment to obtain the 0-axis modulated wave, wherein, at a same moment, a voltage of the 0-axis modulated wave is equal to one third of a sum of a voltage of the A-phase modulated wave, a voltage of the B-phase modulated wave, and a voltage of the C-phase modulated wave.

4. The method of claim 1, further comprising determining that the zero wire of the three-phase UPS is lost by:
 determining absolute values of average values of voltages of phases in the three-phase alternating current; and
 determining that the zero wire is lost when a smallest value of the absolute values is greater than a first threshold.

5. The method of claim 1, wherein the method further comprises:
 determining that the zero wire recovers; and
 when the zero wire recovers, using, as the 0-axis reference current, a signal obtained after proportional-integral adjustment is performed on a difference between a bus difference reference voltage and an actual bus difference, wherein the bus difference reference voltage is zero, and wherein the actual bus difference corresponds to an actual bus voltage difference between a positive bus and a negative bus carrying the direct current provided by the rectifier.

6. The method of claim 5, wherein the determining that the zero wire recovers comprises:
 determining a value of a current on the zero wire in the three-phase alternating current; and
 determining that the zero wire recovers when the value is greater than a second threshold.

7. A three-phase uninterruptible power supply (UPS) apparatus configured to be coupled to a zero wire of a three-phase alternating current (AC) power network, the apparatus comprising:
 a three-phase rectifier configured to receive three-phase AC power from the three-phase AC power network, the three-phase AC power including an A-phase current, a B-phase current, and a C-phase current;
 a memory; and
 a processor coupled to the memory and the three-phase rectifier and configured to:
  determine that the zero wire is lost;
  use an AC signal whose frequency is a harmonic frequency of the three-phase AC power network as a 0-axis reference current when the zero wire is lost;
  calculate a 0-axis sampling current as one third of a sum of the A-phase current, the B-phase current, and the C-phase current received by the rectifier;
  generate a 0-axis modulated wave, with respect to a rotating coordinate system, based on a difference between the 0-axis reference current and the 0-axis sampling current; and
  output a control signal based on the 0-axis modulated wave to control the rectifier to convert the three-phase AC power to a direct current.

8. The apparatus of claim 7, wherein the processor is further configured to perform a proportional adjustment on the difference so that:
 locations of wave peaks of an A-phase modulated wave, a B-phase modulated wave, and a C-phase modulated wave derived based on the 0-axis modulated wave are the same as a location of a wave trough of the 0-axis reference current when the zero wire is normal; and
 locations of wave troughs of the A-phase modulated wave, the B-phase modulated wave, and the C-phase modulated wave are the same as a location of a wave peak of the 0-axis reference current when the zero wire is normal, wherein the frequency of the 0-axis reference current is a 3Nth-order harmonic frequency of the three-phase AC power network, and wherein N is a natural number.

9. The apparatus of claim 8, wherein the processor is further configured to perform amplitude limiting on a difference between a 0-axis sampling voltage and a signal that is output after the proportional adjustment to obtain the 0-axis modulated wave, and wherein, at a same moment, a voltage of the 0-axis modulated wave is equal to one third of a sum of a voltage of the A-phase modulated wave, a voltage of the B-phase modulated wave, and a voltage of the C-phase modulated wave.

10. The apparatus of claim 7, wherein the processor is further configured to:
 determine absolute values of average values of voltages of phases in the three-phase alternating current; and
 determine that the zero wire is lost when a smallest value of the absolute values is greater than a first threshold.

11. The apparatus of claim 7, wherein the processor is further configured to:
 determine that the zero wire recovers; and
 when the zero wire recovers, use, as the 0-axis reference current, a signal obtained after proportional-integral adjustment is performed on a difference between a bus difference reference voltage and an actual bus difference, wherein the bus difference reference voltage is zero, and wherein the actual bus difference corresponds to an actual bus voltage difference between a positive bus and a negative bus carrying the direct current provided by the rectifier.

12. The apparatus of claim 11, wherein the processor is further configured to:
 determine a value of a current on the zero wire in the three-phase alternating current; and
 determine that the zero wire recovers when the value is greater than a second threshold.

13. A three-phase uninterruptible power supply (UPS) configured to be coupled to a zero wire of a three-phase alternating current (AC) power network, the three-phase UPS comprising:
 a three-phase rectifier configured to receive three-phase AC power from the three-phase AC power network, the three-phase AC power including an A-phase current, a B-phase current, and a C-phase current;
 a rectifier controller configured to:
  determine that the zero wire is lost;
  use an AC signal whose frequency is a harmonic frequency of the three-phase AC power network as a 0-axis reference current; and
  calculate a 0-axis sampling current as one third of a sum of the A-phase current, the B-phase current, and the C-phase current received by the rectifier;
  generate a 0-axis modulated wave, with respect to a rotating coordinate system, based on a difference between the 0-axis reference current and the 0-axis sampling current;
  output a control signal based on the 0-axis modulated wave to control the rectifier to convert the three-phase AC power to a direct current; and an inverter coupled to the rectifier configured to convert the direct current to AC.

14. The three-phase UPS of claim 13, wherein the frequency of the 0-axis reference current is a 3Nth-order harmonic frequency of the three-phase AC power network, and wherein N is a natural number.

15. The three-phase UPS of claim 14, wherein the rectifier controller is further configured to perform proportional adjustment on the difference between the 0-axis reference current and the 0-axis sampling current so that:
locations of wave peaks of an A-phase modulated wave, a B-phase modulated wave, and a C-phase modulated wave derived based on the 0-axis modulated wave are the same as a location of a wave trough of the 0-axis reference current when the zero wire is normal; and
locations of wave troughs of the A-phase modulated wave, the B-phase modulated wave, and the C-phase modulated wave are the same as a location of a wave peak of the 0-axis reference current when the zero wire is normal.

16. The three-phase UPS of claim 15, wherein the rectifier controller is further configured to perform amplitude limiting on a difference between a 0-axis sampling voltage and a signal that is output after the proportional adjustment to obtain the 0-axis modulated wave.

17. The three-phase UPS of claim 16, wherein a voltage of the 0-axis modulated wave is equal to one third of a sum of a voltage of the A-phase modulated wave, a voltage of the B-phase modulated wave, and a voltage of the C-phase modulated wave.

18. The three-phase UPS of claim 13, wherein the rectifier controller is further configured to:
determine absolute values of average values of voltages of phases in the three-phase alternating current;
determine that the zero wire is lost when a smallest value of the absolute values is greater than a first threshold;
when the zero wire is lost, use the AC signal whose frequency is the harmonic frequency of the three-phase AC power network as the 0-axis reference current; and
generate the 0-axis modulated wave according to the difference to control the rectifier to convert the three-phase AC power to the direct current.

19. The three-phase UPS of claim 13, wherein the rectifier controller is further configured to:
determine that the zero wire recovers; and
when the zero wire recovers, use, as the 0-axis reference current, a signal obtained after proportional-integral adjustment is performed on a difference between a bus difference reference voltage and an actual bus difference, wherein the bus difference reference voltage is zero, and wherein the actual bus difference corresponds to an actual bus voltage difference between a positive bus and a negative bus carrying the direct current provided by the rectifier.

20. The three-phase UPS of claim 19, wherein the rectifier controller is further configured to:
determine a value of a current on the zero wire in the three-phase alternating current;
determine that the zero wire recovers when the value is greater than a second threshold; and
when the zero wire recovers, use, as the 0-axis reference current, the signal obtained after proportional-integral is performed on the difference.

\* \* \* \* \*